April 22, 1952 E. B. THOMPSON 2,593,630
VEHICLE HOIST
Filed Dec. 13, 1948 4 Sheets-Sheet 1

INVENTOR
Elmer B. Thompson
By Rudolph L. Lowell
atty.

April 22, 1952   E. B. THOMPSON   2,593,630
VEHICLE HOIST
Filed Dec. 13, 1948   4 Sheets-Sheet 2
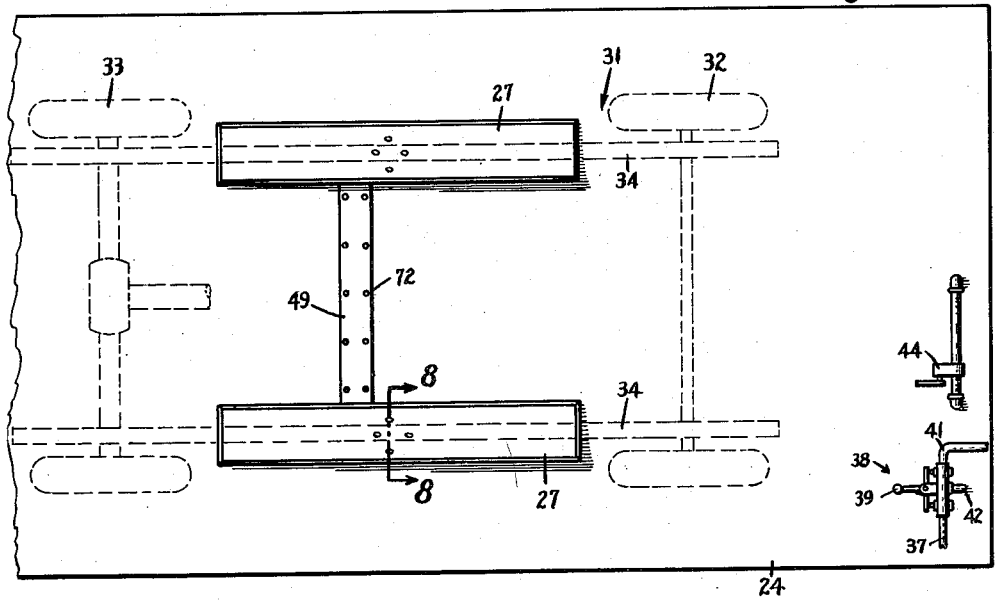
Fig. 2
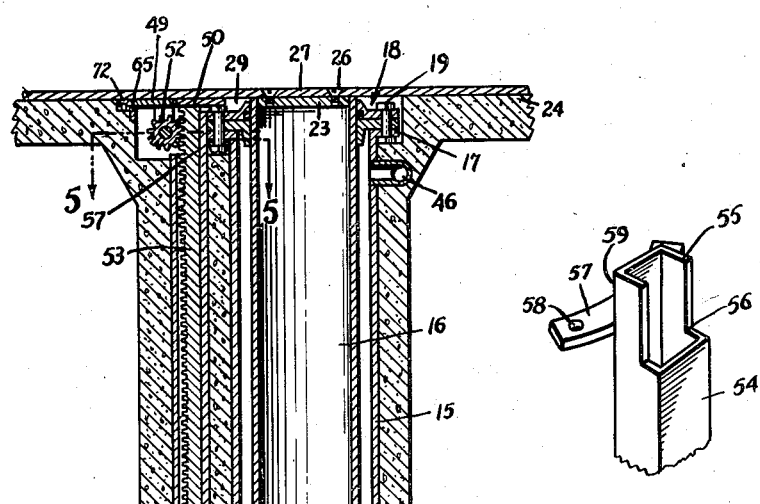
Fig. 3
Fig. 4
INVENTOR
Elmer B. Thompson
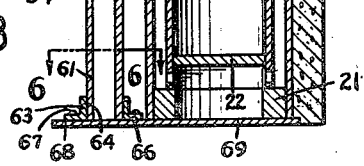
By
att.

April 22, 1952 E. B. THOMPSON 2,593,630
VEHICLE HOIST
Filed Dec. 13, 1948 4 Sheets-Sheet 3
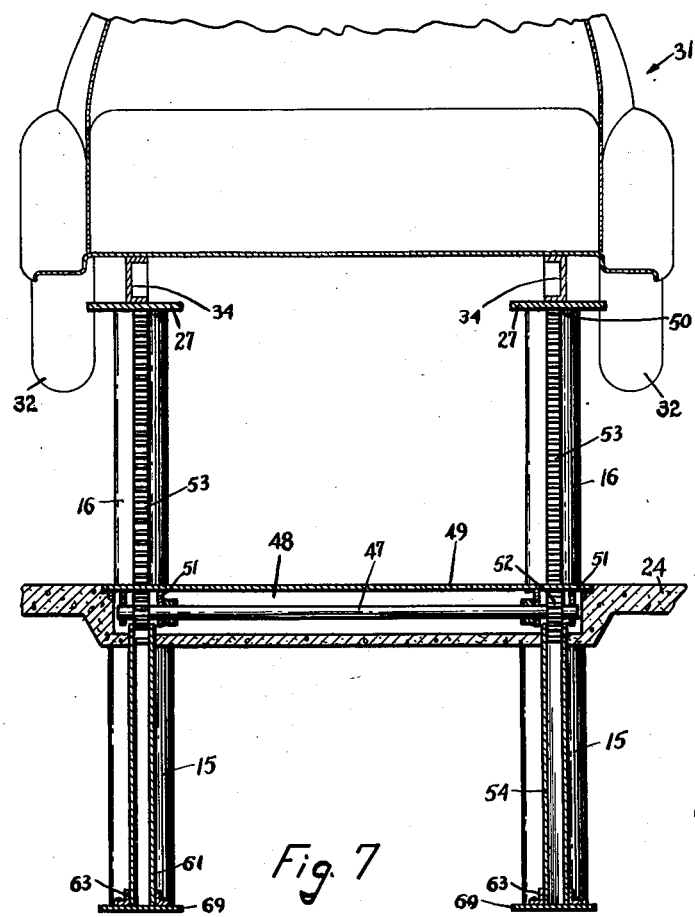
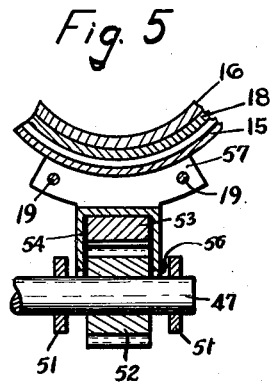
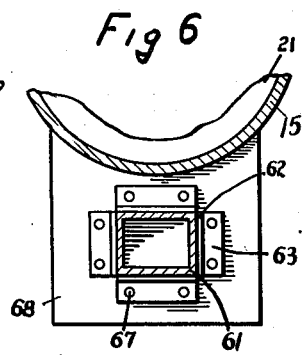
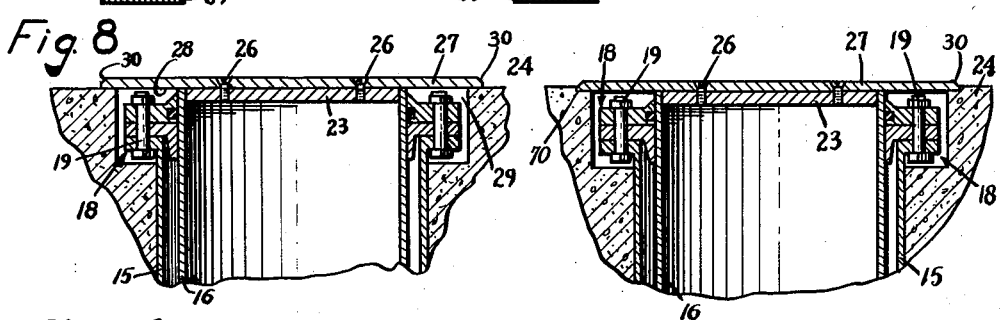
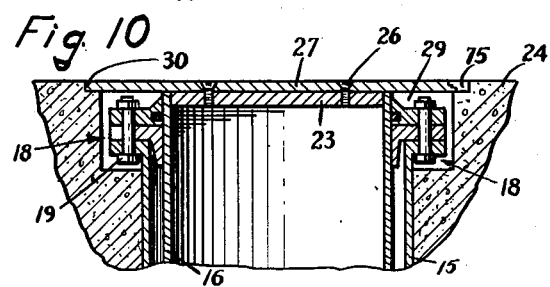
INVENTOR
Elmer B. Thompson
By Rudolph L. Lowell
Atty.

April 22, 1952 E. B. THOMPSON 2,593,630
VEHICLE HOIST
Filed Dec. 13, 1948 4 Sheets-Sheet 4
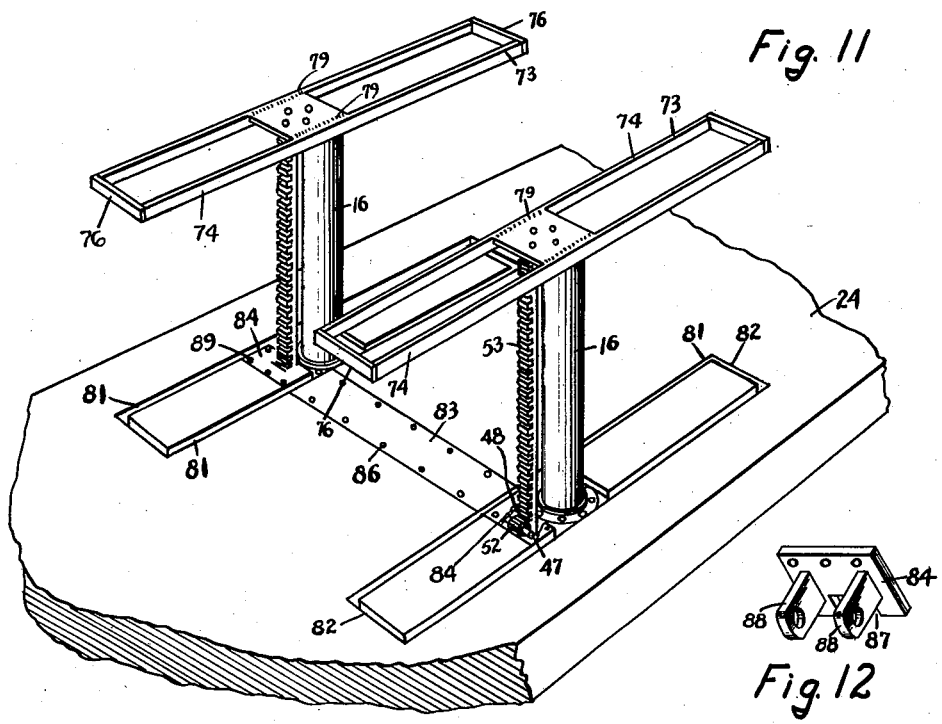
Fig. 11
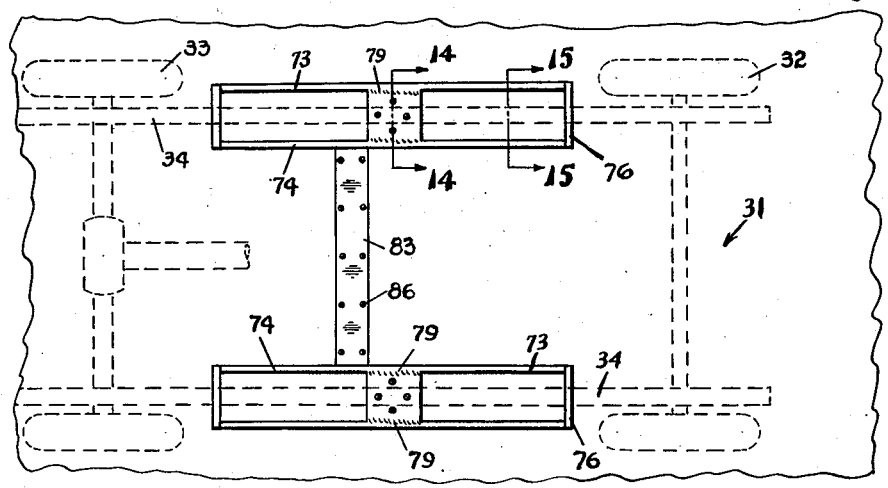
Fig. 12
Fig. 13
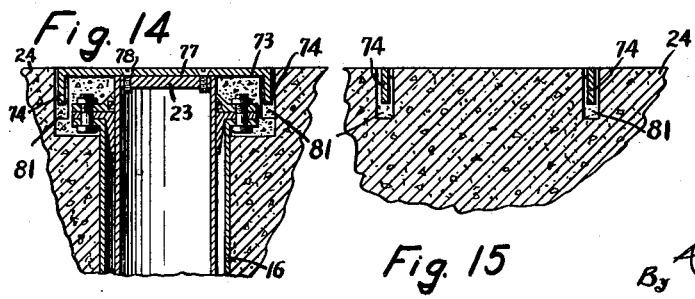
Fig. 14
Fig. 15
INVENTOR
Elmer B. Thompson
By *[signature]*
atty.

Patented Apr. 22, 1952

2,593,630

UNITED STATES PATENT OFFICE 2,593,630

VEHICLE HOIST

Elmer B. Thompson, Des Moines, Iowa, assignor to Globe Hoist Company, Des Moines, Iowa, a corporation of Iowa Application December 13, 1948, Serial No. 65,007

1 Claim. (Cl. 254—89)

This invention relates generally to hoists or lifts to be used in the servicing and lubricating of automobiles and trucks, and in particular to a vehicle hoist of this type which provides for complete accessibility to the under side of a vehicle, and for a free and unobstructive use of the floor space occupied by the hoist, when the hoist is in either a raised or lowered position.

It is an object of my invention, therefore, to provide an improved vehicle hoist.

A further object of my invention is to provide a vehicle hoist of a construction such that all parts at the under side of a vehicle are capable of being serviced and removed while the vehicle chassis is in a supported position on the hoist.

Yet another object of my invention is to provide a vehicle hoist adapted to engage opposite sides of the vehicle frame at positions between the vehicle front and rear wheels whereby the space between the wheels, in a fore and aft direction of the vehicle to be elevated is entirely free and unobstructed.

A still further object of my invention is to provide a vehicle hoist which is economical to manufacture and install, and adapted to provide for a safe and substantially normal use of the floor space occupied by the hoist, when the hoist is in either a raised or a lowered position.

Yet another object of my invention is to provide a hoist capable of raising vehicles having varying wheel bases, without requiring any initial adjustments to accommodate such vehicles.

Yet a further object of my invention is to provide a hoist in which vehicle frame engaging members are of a flat horizontal construction capable of being received in narrow or shallow floor recesses, which can be left uncovered at all times, or the engaging members can be supported directly on the floor surface, without in any way creating any potential physical hazards, such as a foot slipping within a recess or tripping over a frame supporting member.

Further objects, features and advantages of this invention will become apparent from the following description when taken in connection with the accompanying drawings in which:

Fig. 2 is a plan view showing the hoist in a lowered position;

Fig. 3 is an enlarged sectional detail view taken on line 3—3 in Fig. 1, showing the assembly with one of the lift cylinders of a device for synchronizing the movement of the lift pistons;

Fig. 4 is an enlarged fragmentary detail perspective view of a guide member which forms part of the synchronizing device;

Figure 1:
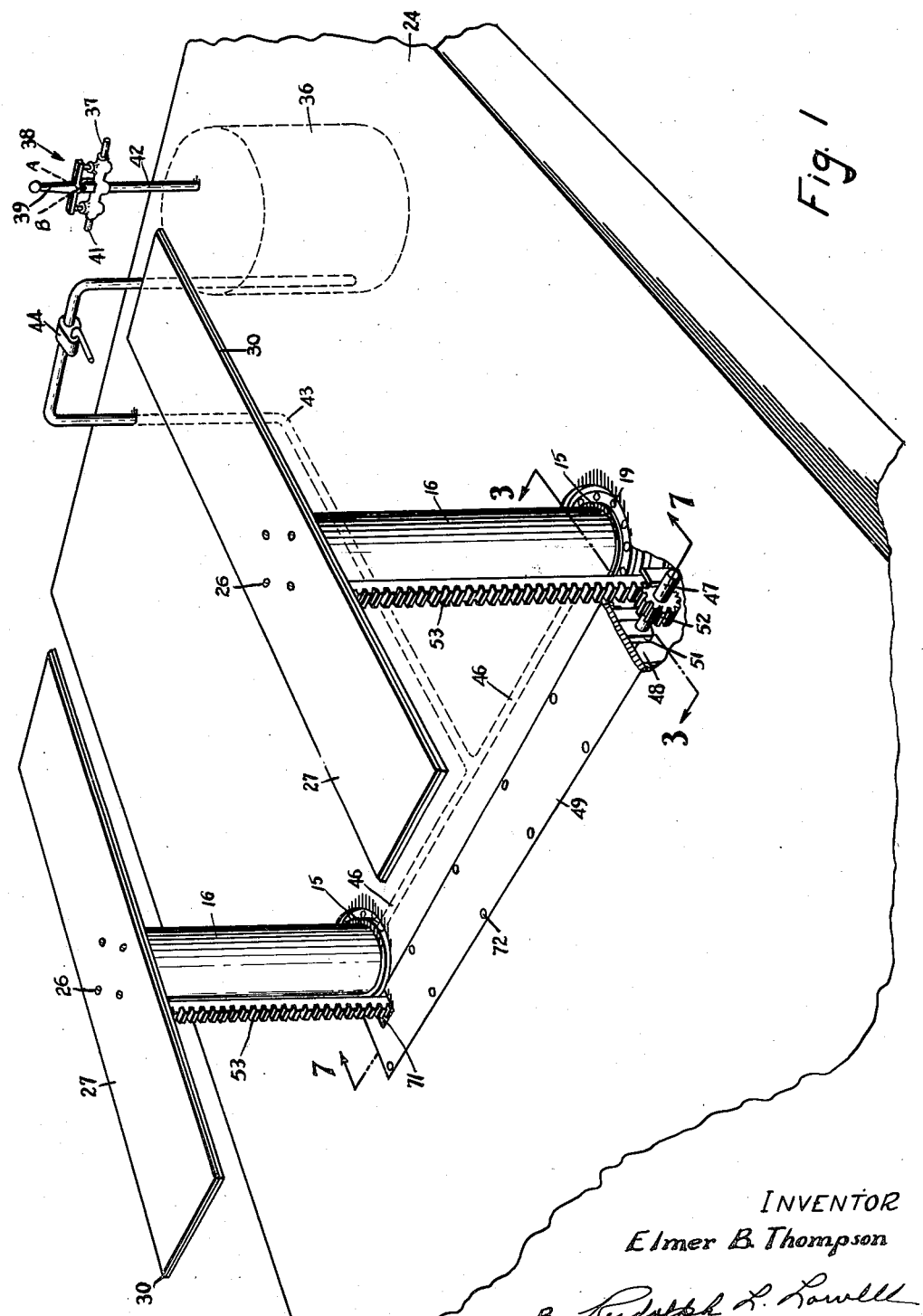
Fig. 1 is a perspective view of the hoist of my invention shown in a raised position and with certain parts broken away to more clearly show its construction.

Figs. 5 and 6 are enlarged sectional detail views as seen on lines 5—5 and 6—6, respectively, in Fig. 3;

Fig. 7 is a transverse sectional view taken substantially on line 7—7 in Fig. 1 showing a vehicle supported on the hoist;

Fig. 8 is an enlarged sectional detail view as seen along the line 8—8 in Fig. 2, showing the vehicle frame engaging member of the hoist in a lowered position on the floor surface;

Figs. 9 and 10 are illustrated similarly to Fig. 8, and show modified installations of the vehicle frame engaging members;

Fig. 11 is a perspective view of a modified form of the hoist of my invention shown in a raised position;

Fig. 12 is an enlarged detail perspective view of a pit cover member;

Fig. 13 is a reduced plan view of the hoist of Fig. 11 with the hoist shown in a lowered position; and Figs. 14 and 15 are enlarged sectional detail views taken on the lines 14—14 and 15—15, respectively, in Fig. 13.

With reference to the drawings, the hoist of my invention is shown in Fig. 1 as including a pair of oppositely arranged transversely spaced hoists of a like construction. Only one of the hoists, therefore, will be referred to in detail in the following description and like numerals will be used to designate like parts in the hoists.

Each hoist is floor mounted and includes a cylinder 15 (Figs. 1 and 3) operatively associated with a piston or lifting member 16. The upper end of the cylinder 15 is formed with a laterally extended annular flange 17 to which a combination packing and upper bearing member for the piston 16, indicated generally at 18, is secured by clamping bolts 19. The lower end of the piston 16 is guided for up and down movement within the cylinder by a lower movable bearing 21.

The piston 16 is of a hollow construction closed at its lower end by a bottom wall 22 and at its upper end by a top wall or cover member 23. The cylinder 15 is mounted within the floor surface 24 such that when the piston 16 is in its lowered position the top surface of the piston cover member 23 is substantially level with the floor surface 24. Secured to the cover member 23 as by countersunk screws 26 is a vehicle frame engaging or contact member 27 of a horizontal flat plate construction. The frame contact member 27 is of a substantially rectangular shape and extended longitudinally of the vehicle to be lifted.

When the piston 16 is in a lowered position, as shown in Fig. 8, the bottom side 28 of the frame contact member 27 rests directly on the top of the floor surface 24 in a covering relation with the floor opening 29 formed about the upper end of the cylinder 15 to accommodate the cylinder flange 17 and bearing member 18. It is contemplated that the contact member 27 be of a relatively narrow thickness so that in a lowered position of the piston 16, and with the member 27 resting directly on the floor 24, the floor space occupied by the hoist is capable of being normally used, namely, grease wagons, wheel dollies, vehicles and the like, can freely travel thereover. Further, because of this relatively narrow thickness, garage men can walk over the hoist without fear of tripping over any obstructing part of the hoist. To further facilitate the passage of vehicles and persons over the contact members 27 the peripheral edge of the top side of the contact members may be formed with an angle or a chamfer 30.

In the operation of the hoist of my invention the hoists are initially in their lowered positions with the contact members 27 supported on the floor surface 24. A vehicle, indicated in dotted lines at 31 in Fig. 2, is then driven over the hoist in a direction parallel with the contact members 27 to a position such that the members 27 are located between the vehicle front wheels 32 and rear wheels 33 in a direction fore and aft of the vehicle. The hoists are spaced a distance apart corresponding substantially to the transverse dimension of the vehicle 31 to provide for the engagement of the side frame members 34 of the vehicle main frame or chassis 36 by the contact members 27 when the hoists are elevated. The width of the contact members 27 is such as to provide for the engagement of the side frame members 34 by the contact members, without requiring an exact centering of the frame members 34 relative to the hoists. Since only a small eccentric loading results when the side frame members 34 are adjacent to the side portions of the contact members 27, the efficiency of the hoist is in no way impaired.

It is to be importantly noted that the location of the vehicle with the contact members 27 between its front wheels 32 and rear wheels 33 takes place without regard to the wheel base of the vehicle 31. As a result the usual adjustment of axle engaging members, now required in hoists in general commercial use, is entirely eliminated with a resultant saving in time and in convenience.

On elevation of the pistons 16 to raise the vehicle 31 (Fig. 7) the lower sides of the vehicle frame members 34 are directly engaged by the top sides of the contact members 27. Since the members 27 are of a length corresponding substantially to the distance between the front wheels 32 and the rear wheels 33 of the vehicle, the vehicle is positively supported against both lateral and longitudinal tilting movement. As a result the piston 16 may be positioned anywhere between the ends of a corresponding contact member 27, to apply a single upward force thereon, while still maintaining a positive support of the vehicle in an elevated position. Due to the transverse spacing of the hoists, and the extension of the contact members 27 longitudinally of the vehicle, and along opposite sides thereof, a maximum working space is afforded to a service man or mechanic for repairing or lubricating parts at the under side of the vehicle.

Stated otherwise, a mechanic is free to walk under the car, over its full length, without interference from either of the two hoists, and to work on either side of the car over its full length. Further, since only the frame side members 34 are engaged by the contact members 27 either axle of the vehicle 31 can be completely removed, or the torque tube can be completely disassembled, without requiring the use of any high horses or the like, as is now common practice when work is to be done on these parts of the vehicle.

The pistons 16 are raised and lowered in the usual manner by means including a buried oil tank 36 (Fig. 1) connected with a compressor or the like (not shown) by an air inlet pipe 37 equipped with an air control valve, indicated generally as 38, and including a control lever 39 and an air exhaust port 41. On movement of the lever 39 to its dotted line position shown at A, air under pressure is supplied to the tank 36 through the line 42; on movement of the lever 39 to its neutral or full line position shown in Fig. 1, air is prevented from travelling through the line or pipe connection 42; and on movement of the lever 39 to its dotted line position shown at B, air is exhausted from the tank 36 through the exhaust outlet 41.

The tank 36 is connected with the cylinders 15 through an oil supply line 43 provided with an oil control valve 44 and terminating in inlet feed lines 46 which are connected to the cylinders 15. The oil valve 44 and air valve 38 are conveniently located near each other at positions above the floor 24 for concurrent actuation by the hoist operator. In this manner, the pistons 16 are simultaneously operated in response to a manipulation of the oil control valve 44.

To assure a positive unified movement of the pistons 16 I provide a synchronizing mechanism which includes a shaft 47 (Fig. 7) extended transversely between the hoists and mounted in a floor pit 48 adapted to be closed by a cover member 49 of a substantially rectangular shape. Each end of the shaft 47 is rotatably supported in a pair of bearing plates 51 which are secured to and project downwardly from the cover member 49 at positions opposite the hoist cylinders 15. Mounted on the shaft 47, between each pair of bearing plates 51, is a pinion gear 52 adapted for meshing engagement with a gear rack 53 having its upper end connected at 50 with the under side of a respective contact member or plate 27. Since relative assembly and construction of a rack 53 and its associated pinion gear 52 is the same for each hoist, only one of these assemblies will be referred to in detail in the following description.

A rack 53 (Figs. 3, 4 and 5) is guidably supported for up and down movement within a square tubular member 54 of a length substantially coextensive with a cylinder 15 and positioned in the ground surface 24 at a position adjacent to and in a parallel relation with a cylinder 15. The upper end of the tube or rack guide 54 has its upper end 55 cut away, as indicated at 56, to receive the shaft 47. At a position spaced downwardly from its upper end 55, and opposite the cut away portion 56, the tube 54 has welded thereto a laterally projected flat arcuate strap 57 formed at each end with an opening 58 for receiving a clamping bolt 19.

In assembly, the strap 57 is positioned below and in contact engagement with the cylinder flange 17, with the wall portion 59 of the tube 54 located between the strap 57 and its upper end 55 in abutting engagement with the outer periphery of the upper piston bearing member 18. The clamping bolts 19 are then extended through the bearing member 18, the flange 17 and the strap 57 so that on being tightened the upper end of the tube 54 is positively secured to the upper end of the cylinder 15.

The lower end 61 of the tube 54 (Figs. 3 and 6) is received within an upstanding rim 62 of a shape corresponding to the transverse section of the tube 54, and formed by suitably arranging together four angle sections 63, the vertical legs 64 of which constitute the rim 62 and the horizontal legs 66 of which are secured by bolts 67 to a laterally extended flange or support 68 formed as a part of the cylinder base 69. It is to be understood, of course, that the lower end 61 of the tube 54, is inserted within the rim 62 prior to the assembly of the tube with the upper end of the cylinder 15.

The cover member 49 (Figs. 1 and 3) is cut away at 71 to receive the rack 53 and is firmly secured to the floor surface 24 as by countersunk screws 72 threadable within angle members 65 which define the upper edges of the pit opening 48 for the shaft 47.

In operation, the lowering or raising of either hoist provides for a like movement of the other hoist regardless of the load distribution on the hoist. As a result the pistons 16 operate together as a unit. In some instances the synchronizing mechanism, above described, may be eliminated and the movement of the piston 16 controlled by the double oil valve arrangement shown in my Patent No. 2,423,954.

As previously mentioned, the contact members 27, in a lowered position of the pistons 16, rest directly on the floor surface 24. Since these members are of a relatively narrow thickness, in the neighborhood of about one inch, the hoist in its lowered position provides for a substantially normal use of the floor space occupied by the hoist while eliminating entirely the need for any recesses in the floor for receiving the members 27. The installation cost of the hoist is thus substantially reduced.

However, if desired, the contact members 27 may be fully received within floor recesses 75, as shown in Fig. 10 or in the use of a heavy duty hoist for truck and bus work, for example, if it is desired to strengthen the contact members 27 by increasing their thickness, in the neighborhood of about two and one-half inches, they may be partially received within floor recesses 70 as shown in Fig. 9. This is accomplished by merely installing the cylinders 15 at corresponding increased depths within the floor 24, relative to its showing in Fig. 3. By thus recessing the floor 24, a safe and normal use of the floor surface occupied by the hoist is maintained for both a raised or lowered position of the hoist.

The modified form of my invention shown in Figs. 11-15, inclusive, is similar in all respects to the hoist shown in Fig. 1 except that contact members 73 are substituted for the contact members 27. Like numerals will be used, therefore, to designate like parts in my modified form.

A contact member 73 is of an open frame construction, and rectangular in shape, having side upright flat members 74 connected together at their ends by upright flat end members 76. Received between the side members 74, at a position intermediate the ends thereof, is a support member 77 which is secured to a piston cover 23 by screws 78. In turn the support member 77 is fixed to the side members 74 by welding, indicated at 79. In order to receive the side members 74 and end members 76 within the floor 24, such that the supporting member 77 is flush with the floor, when the hoist is in its lowered position shown in Fig. 13, the floor for each hoist, is formed with a pair of parallel recesses or grooves 81 arranged at opposite sides of a hoist at a distance apart corresponding to the distance between a pair of respective side members 74. Grooves or recesses 82, for the end members 76, extend transversely between opposite ends of the longitudinal recesses 81, with the recesses 81 and 82 being of a size and shape to receive therein the members 74 and 76, respectively.

To accommodate the inner adjacent members 74 of the contact members 73 the closure means for the shaft pit 48 is comprised of a center cover 83 and a pair of end covers 84. The center cover 83 extends transversely between the inner adjacent grooves 81 and is secured by countersunk screws 86 to the upper portions of the side walls which define the pit 48.

Each end cover 84 (Figs. 11 and 12) extends transversely between a pair of corresponding floor recesses 81 and is cut away at 87 to receive a rack 53. The shaft 47 for the pinions 52 has each end thereof supported in a pair of spaced bearing plates 88 projected downwardly from an end cover 84 to opposite sides of the cut away portion 87 therein. Floor screws 89 are used to hold the end covers 84 in fixed positions on the floor 24.

On the lowering of a hoist the members 74 and 76 are thus received within their corresponding grooves 81 and 82, respectively, so that the side members 74 are in a straddling relation with an end cover 84. The contact members 73 are thus flush with the floor surface 24. Since the grooves 81 and 82 are relatively narrow, being less than about one and one half inches wide, they in no way interfere with a normal use of the floor 24, when the hoist is elevated. Since the operation of the modified form of my hoist is similar in all respects to the operation of the hoist shown in Fig. 1, a further description of its operation is believed to be unnecessary.

From a consideration of the above description it is seen that my invention provides a hoist which is of a simple construction, economical to manufacture and install, and substantially universal in its application to automobiles and trucks. Thus, a single hoist of adequate capacity will handle both automobiles and trucks. Further, since no floor recesses are required for receiving the vehicle frame engaging members, a full and clear walking space for a mechanic or a service man is provided over the entire floor surface 24 beneath an elevated vehicle. Since only those portions of the vehicle frame members 34, extended between the vehicle front and rear wheels, is contacted by the frame engaging members, full accessibility is given to all of those parts at the under side of the vehicle so that the car, while in an elevated position, can be completely dismantled so that only its main frame or chassis remains on the hoist. Further, any large part removed from the car, such as a torque tube, can be carried away from either end of the car for bench work or the like, without interference in any way from the raised pistons 16.

Although my invention has been described and illustrated with respect to several preferred forms thereof, it is to be understood that it is not to be so limited since changes and modifications can be made therein which are within the full intended scope of my invention as defined by the appended claim.

I claim:

For elevating a vehicle having a main frame with front and rear wheels thereon, a vehicle lift including a pair of transversely spaced lift members, a horizontal flat plate mounted directly on each lift member and of such a length to engage only a portion of the frame of the vehicle between the front and rear wheels and presenting a flat continuous upper surface to so engage the vehicle frame, said horizontal plates, in the use of the lift, being located between said front and rear wheels and of a length to support said frame against longitudinal tilting movement.

ELMER B. THOMPSON.

REFERENCES CITED

The following references are of record in the file of this patent:

UNITED STATES PATENTS

| Number | Name | Date |
|---|---|---|
| 877,709 | Gearing | Jan. 28, 1908 |
| 1,889,185 | Stukenborg | Nov. 29, 1932 |
| 2,069,236 | Fitch | Feb. 2, 1937 |
| 2,124,726 | Blum | July 26, 1938 |
| 2,423,954 | Thompson | July 15, 1947 |

FOREIGN PATENTS

| Number | Country | Date |
|---|---|---|
| 156,532 | Switzerland | Dec. 1, 1932 |
| 693,400 | France | Aug. 25, 1930 |